(12) United States Patent
Hayes

(10) Patent No.: US 12,284,184 B2
(45) Date of Patent: Apr. 22, 2025

(54) IDENTITY ADAPTER AND METHOD

(71) Applicant: INVISINET TECHNOLOGIES, LLC, Houston, TX (US)

(72) Inventor: John William Hayes, Clearwater Beach, FL (US)

(73) Assignee: INVISINET TECHNOLOGIES, LLC, Houston, TX (US)

( * ) Notice: Subject to any disclaimer, the term of this patent is extended or adjusted under 35 U.S.C. 154(b) by 310 days.

(21) Appl. No.: 18/079,488

(22) Filed: Dec. 12, 2022

(65) Prior Publication Data

US 2024/0195810 A1 Jun. 13, 2024

(51) Int. Cl.
*H04L 9/40* (2022.01)

(52) U.S. Cl.
CPC .......... *H04L 63/0884* (2013.01); *H04L 63/10* (2013.01); *H04L 63/166* (2013.01); *H04L 63/20* (2013.01)

(58) Field of Classification Search
CPC ... H04L 63/0884; H04L 63/166; H04L 63/20; H04L 63/10; H04L 63/0281
See application file for complete search history.

(56) References Cited

U.S. PATENT DOCUMENTS

| 2014/0201820 | A1 | 7/2014 | Li et al. |
| 2017/0163619 | A1* | 6/2017 | McLaughlin ....... H04L 63/0245 |
| 2017/0257236 | A1* | 9/2017 | Kobayashi .............. H04L 69/22 |
| 2018/0234326 | A1 | 8/2018 | Swierk et al. |
| 2019/0356482 | A1 | 11/2019 | Nix |

OTHER PUBLICATIONS

International Search Report and Written Opinion dated Apr. 3, 2024, for International Application No. PCT/US2023/079251.

* cited by examiner

*Primary Examiner* — Olugbenga O Idowu
(74) *Attorney, Agent, or Firm* — Richard A. Fagin

(57) ABSTRACT

An identity adapter permits the enabling, the receiving, adapting, and sending of identity credentials using the appropriate secure communication mechanisms where one of the devices in the communication utilizes an archaic, obsolete, or rare communication protocol and identity credential. The identity adapter provides for secure communication between a first network device and a second network device, the first network device using a first security protocol, the second network device using a second security protocol using a first protocol module, an identity associator, a second protocol module, and a data proxy.

46 Claims, 14 Drawing Sheets

IDENTITY ADAPTER AND METHOD

CROSS-REFERENCE TO RELATED APPLICATIONS

None

STATEMENT REGARDING FEDERALLY SPONSORED RESEARCH OR DEVELOPMENT

Not Applicable.

BACKGROUND

Field

The present disclosure relates to systems and methods for providing computer security, to identity authentication, and to the communication of identity credentials and their secure communication protocols. More particularly, the present disclosure pertains to an apparatus and a method for enabling the receiving, adapting, and sending of identity credentials using the appropriate secure communication mechanisms where one of the devices may utilize an archaic, obsolete, or rare communication protocol and identity credential.

Description of the Related Art

Secure computer communication protocols are a necessary requirement in today's operational computer environments. These protocols utilize cryptographically secured identity credentials as key components. Older legacy computer devices may not have the same secure communication protocols and identity credentials required by more modern systems and may therefore be unable to communicate, barring users from access. The first network device may therefore use a first security protocol while the second network device, with which communication is desired uses a second security protocol, where the first security protocol is different from the second security protocol, frustrating any attempt to establish communication between the first network device and the second network device. The present disclosure provides an adapter between different security communications protocols and different identity credentials.

The development of such a system would constitute a major technological advance and would satisfy long felt needs and aspirations in the network security industry.

SUMMARY

The present disclosure therefore meets the above needs and overcomes one or more deficiencies in the prior art by providing an identity adapter for enabling secure communication between a first network device and a second network device, the first network device using a first security protocol, the second network device using a second security protocol, where the first security protocol is incomprehensible to the second network device, which includes a first protocol module, an identity associator, a second protocol module, and a data proxy, where the first protocol module is in communication with the data proxy, and where the first protocol module is configured to communicate with the first network device, where the second protocol module is in communication with the data proxy, where the data proxy is in communication with the identity associator, where the first protocol module is configured to receive the first security protocol first communication from the first network device according to the first security protocol, the first security protocol first communication having a first communicated data and a first identity, the first protocol module configured to process the first security protocol first communication according to the first security protocol to extract the first communicated data and the first identity, wherein the first protocol module is configured to convey the first communicated data and the first identity to the data proxy, the data proxy configured to convey the first identity to the identity associator, the identity associator configured to select one of a plurality of potential identities as a second identity using the first identity in a selection criteria, the identity associator configured to communicate the second identity to the data proxy, the data proxy configured to store proxy state information including the first identity and the second identity, the data proxy configured to communicate the first communicated data and the second identity to the second protocol module, the second protocol module configured to communicate the first communicated data and the second identity to the second network device using the second security protocol as a second security protocol first communication.

The disclosure further provides a method for enabling secure communication between a first network device and a second network device, the first network device using a first security protocol, the second network device using a second security protocol, where the first security protocol is incomprehensible to the second network device, which includes the steps of providing an identity adapter having a first protocol module, a data proxy, an identity associator, and a second protocol module; communicating a first security protocol first communication to the identity adapter from the first network device, the first security protocol first communication including a first identity and first communicated data; processing by the first protocol module the first security protocol first communication to extract or identify for subsequent use the first identity and the first communicated data; conveying from the first protocol module the first identity and the first communicated data to the data proxy; conveying from the data proxy the first identity to the identity associator; selecting by the identity associator a second identity from a plurality of potential identities using the first identity in a selection criteria; conveying from the identity associator the second identity to the data proxy; storing by the data proxy state information including the first identity and the second identity; conveying from the data proxy the second identity and the first communicated data to the second protocol module; communicating using the second protocol a second security protocol first communication from the second protocol module to the second network device, the second security protocol first communication including the second identity and the first communicated data.

In another embodiment, the present invention includes a non-transitory program carrier device tangibly carrying computer-executable instructions for enabling secure communication between a first network device and a second network device, the first network device using a first security protocol, the second network device using a second security protocol, where the first security protocol is incomprehensible to the second network device, which includes the steps of communicating a first security protocol first communication to the identity adapter from the first network device, the first security protocol first communication including a first identity and first communicated data; processing by the first protocol module the first security protocol first communication to extract or identify for subsequent use the first identity and the first communicated data; conveying from the first protocol module the first identity and the first communicated data to the data proxy; conveying from the data proxy the first identity to the identity associator; selecting by the identity associator a second identity from a plurality of potential identities using the first identity in a selection criteria; conveying from the identity associator the second identity to the data proxy; storing by the data proxy state information including the first identity and the second identity; conveying from the data proxy the second identity and the first communicated data to a second protocol module; and communicating using the second protocol a second security protocol first communication from the second protocol module to the second network device, the second security protocol first communication including the second identity and the first communicated data.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

Figure 1:
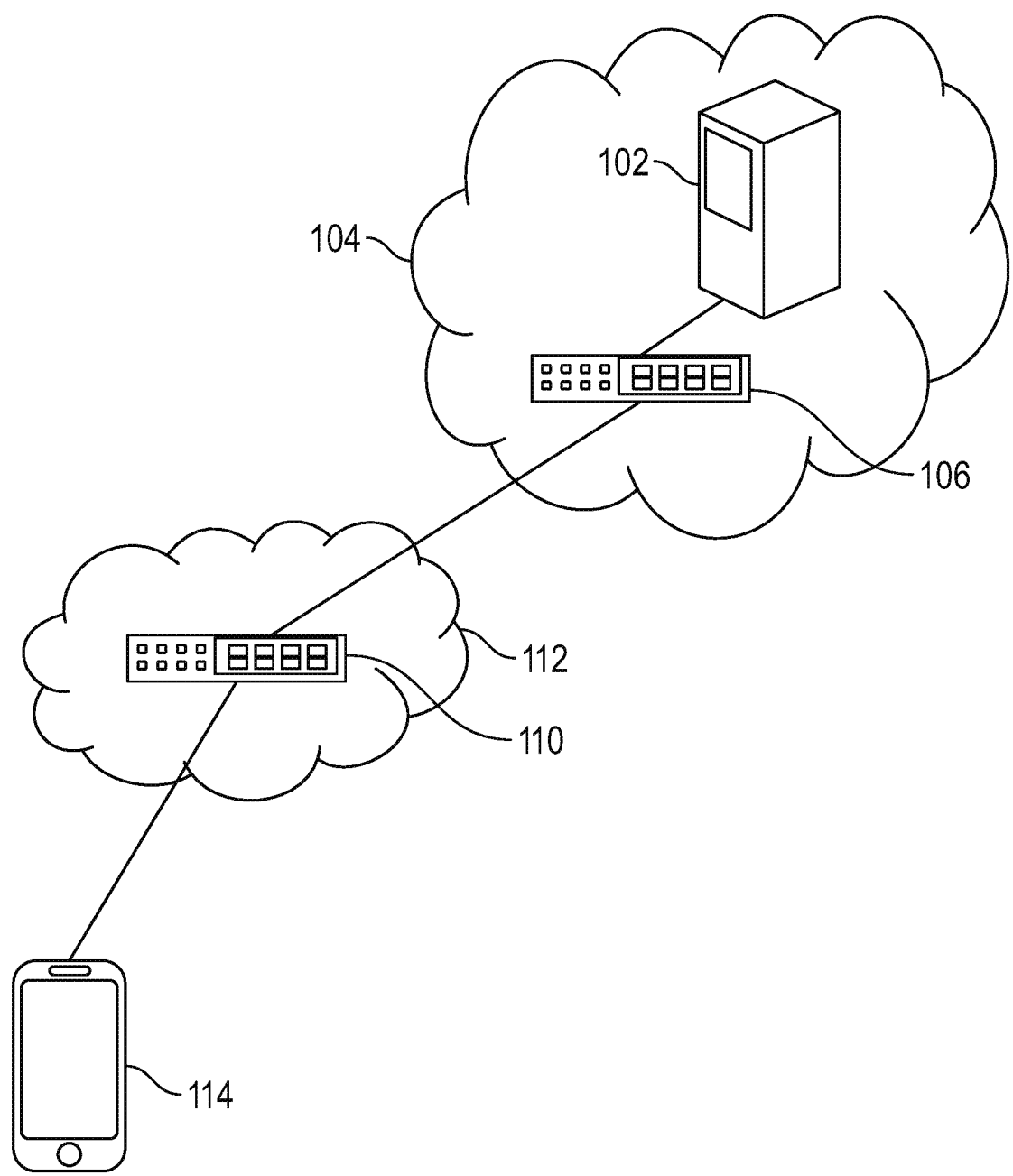
FIG. 1 provides an illustration of the present disclosure in connection with two devices.

The subject matter of the present disclosure is described with specificity; however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

It is known that a device such as a smartphone may have software that cannot be modified or updated, which can create issues as technology evolves but users retain existing devices. This restriction on modification or updating may be for security purposes and/or to prevent the loading of malicious software. Such devices may have the capability to securely communicate using or via a Virtual Private Network (VPN) technology, which may use the IPsec secure communications protocol. A user of such a device may wish to connect to a cloud service protected from discovery and access by the communications security technology Transport Access Control (TAC). The present disclosure provides an apparatus, an identity adapter, where such a device connects using or via a VPN. In the process of establishing VPN communications, the device communicates its VPN identity credential. The VPN credential is often a Public Key Infrastructure (PKI) certificate. The identity adapter authenticates the VPN identity credential and authorizes the establishment of the VPN communications. The device then sends a communication to the cloud service. The communication is conveyed via the VPN to the identity adapter. The identity adapter uses the VPN identity credential to select an associated TAC identity credential. The TAC identity credential is often a second PKI certificate. The identity adapter uses the TAC identity credential to establish communications with the cloud service protected by the TAC technology. At this point, the device can communicate with the cloud service. The identity adapter provides VPN secure communications and TAC authenticated communications between the device and the cloud service.

As used herein, the following terms are defined as follows:

Authentication—The act of confirming the truth of an attribute claimed true by an entity.

Cloud—A network of remote servers which operate as a single ecosystem. These servers can be configured to store and manage data, run applications, and deliver content or a service such as streaming videos, web mail, office productivity software, or social media. The cloud is accessible from any Internet-capable device—the information will be available anywhere you go and anytime you need it.

Cloud Service—Cloud services are infrastructure, platforms, or software that are hosted by third-party providers and made available to users through the internet.

Communication—A communication is one or more messages conveyed in either direction between the communicating parties.

CPU—Central Processing Unit. A processor or a set of circuits that processes CPU instructions.

CPU Instructions—A set of instructions that controls the operation of a CPU.

Identity—An identity is a collection of attributes about an entity that distinguish it from other entities. Entities are anything with distinct existence, such as people, or devices.

Identity Credential—An identity credential is a set of claims made by an entity about an identity.

Input/Output Interface—An electronic circuit that communicates with other electronic circuits in accordance with a specification.

Internet Protocol (IP)—The Internet Protocol is a data oriented protocol used by devices to communicated across a packet switched network. IP information is carried by an IP header in an IP packet. The IP header contains device address information, protocol control information and user data information.

Internet Protocol Security (Ipsec)—Internet Protocol Security is a protocol suite for securing Internet Protocol (IP) communications by authenticating and encrypting each IP packet of a data stream. Ipsec also includes protocols for establishing mutual authentication between agents at the beginning of the session and negotiation of cryptographic keys to be used during the session.

Memory—An electronic circuit which allows for the temporal storage of data.

Network—A network is a collection of computers, servers, clients, routers and devices that are connected together such that they can communicate with each other. The Internet is an example of a network.

Network Device—A network device is any object that is capable of being attached to a network. Examples of devices include computers, servers, clients, laptops, tablets, cell phones, smart phones, network appliances, storage systems, virtual appliances, switches, routers, load balancers, caches, intrusion detection systems, authentication devices, intrusion prevention systems, and firewalls.

Open Systems Interconnection (OSI) Model—The Open Systems Interconnection model (OSI model) is a conceptual model that provides a common basis for the coordination of standards development for the purpose of systems interconnection. In the OSI reference model, the communications between a computing system are split into seven different abstraction layers: Physical, Data Link, Network, Transport, Session, Presentation, and Application. The OSI model defines seven abstraction layers for communications. Each layer relies on the layer below to perform a set of abstracted functions. For example, a network layer, provided as a third layer, is responsible for the routing and delivery of packets, while the transport layer, provided as a fourth layer, is responsible for the delivery of data at a specified service type. Security protocols can operate at each of the ISO protocol stack layers. For example, Ipsec operates at the network layer, while TAC and TLS operate at the transport layer. At the data link layer, provided as a second layer, MACsec is a security protocol that provides confidentiality between link participants. The identity adapter can accommodate any security protocol at any ISO protocol stack layer.

Protocol—In the field of telecommunications, a protocol is the set of standard rules for data representation, signaling, authentication, error detection and other features required to send information over a communications channel. Not all protocols provide all of these features. Protocols with different features may be layered on top of one another to provide a more robust feature set. Examples of protocols are the IP protocol and the TCP protocol. These protocols are often used together and referred to as the TCP/IP protocol.

Protocol module—A device, function, process, or procedure that implements a protocol.

Public Key Infrastructure (PKI)—A set of policies, processes, server platforms, software and workstations used for the purpose of administering certificates and public-private key pairs, including the ability to issue, maintain, and revoke public key certificates.

PKI Certificate—A set of data that uniquely identifies an entity, contains the entity's public key, and is digitally signed by a trusted party, thereby binding the public key to the entity. Public Key Identity (PKI) certificates are composed of a public key and a private key. The private key is never communicated and, as its name suggests, is kept private. Two entities using or otherwise utilizing PKI certificates exchange public keys, enabling them to determine a shared secret without exposing their private keys. This shared secret is then used for cryptographic purposes such as encryption and authentication. Because the private key is never shared, participants in public key cryptography do not have the ability to impersonate the remote PKI certificate. Thus, in a PKI certificate environment, a second PKI certificate must be used as the second identity.

Security Protocol—A security protocol is a protocol that performs a security function or a combination of functions such as data confidentiality, integrity, or authentication. Security protocols usually employ cryptographic functions in their operation.

Statistical Object Identification (SOI)—Statistical object identification is used where the conventional secured communications of an original object, such as a PKI certificate, cannot be used due to protocol constraints or communications bandwidth limitations. Using or employing a statistical object instead of an original object greatly reduces the required communications bandwidth by using or utilizing a deterministic statistical representation of the original object. Statistical objects identification is used in systems that utilize non-interactive authentication, which do not require the authenticating system to provide any response until authentication has been completed. Statistical Object Identification is described and claimed in U.S. Pat. No. 8,572,697, entitled Method for Statistical Object Identification. The text and drawings of U.S. Pat. No. 8,572,697 are hereby incorporated by reference. Statistical Object Identification is also described and claimed in U.S. Pat. No. 9,973,499 entitled Method for Statistical Object Identification. The text and drawings of U.S. Pat. No. 9,973,499 are hereby incorporated by reference.

Storage—A technology or device which allows for the reading and writing of data that persists over time. Volatile storage fails after power is removed. Non-volatile storage does not require power to maintain its storage capabilities. Dynamic Random Access Memory is an example of volatile storage. FLASH memory and disk drives are examples of non-volatile storage.

Transport Access Control (TAC)—Transport Access Control is an authentication protocol that uses single use cryptographic identity tokens to individually authenticate TCP/IP sessions before allowing TCP session establishment. Identity token authentication is performed noninteractively, providing no response to the sender until successful authentication has completed. This differs from how the TCP protocol operates, as the TCP protocol does not allow identity credentials to be exchanged and authenticated until after the TCP session is fully established, exposing critical resources to examination by opponents. TAC enhances TCP and closes this vulnerability, protecting network resources from discovery, reconnaissance, and unauthorized access. Transport Access Control is described and claimed in U.S. Pat. No. 6,973,4967, entitled Concealing a Network Connected Device. The text and drawings of U.S. Pat. No. 6,973,496 are hereby incorporated by reference. Transport Access Control is also described and claimed in U.S. Pat. No. 8,346,9517, entitled Method for First Packet Authentication. The text and drawings of U.S. Pat. No. 8,346,951 are hereby incorporated by reference.

Transport Layer Security (TLS)—Transport Layer Security (TLS) and its predecessor, Secure Sockets Layer (SSL), are cryptographic protocols that provide security for communications over networks such as the Internet.

Virtual Private Network (VPN)—A virtual private network (VPN) extends a private network across a public network and enables users to send and receive data across shared or public networks as if their computing devices were directly connected to the private network. It provides access to resources that are inaccessible on the public network and is typically used for remote workers. Encryption is common, although not an inherent part of a VPN connection.

Figure 2:
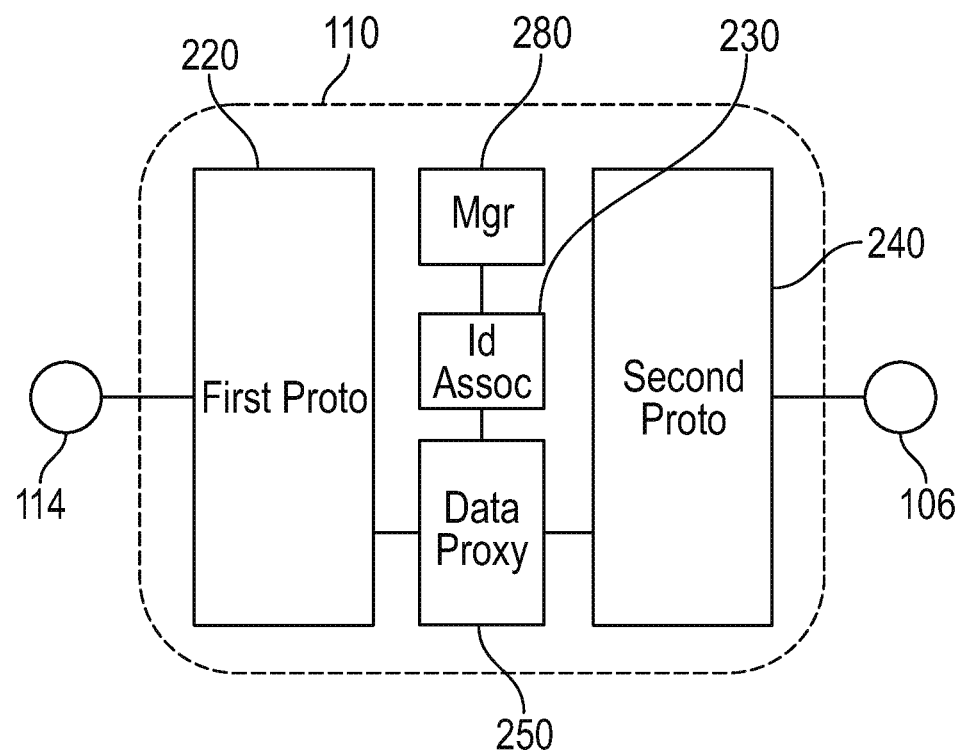
FIG. 2 provides a diagram of the identity adapter of the present disclosure in connection with two devices.
Figure 3:
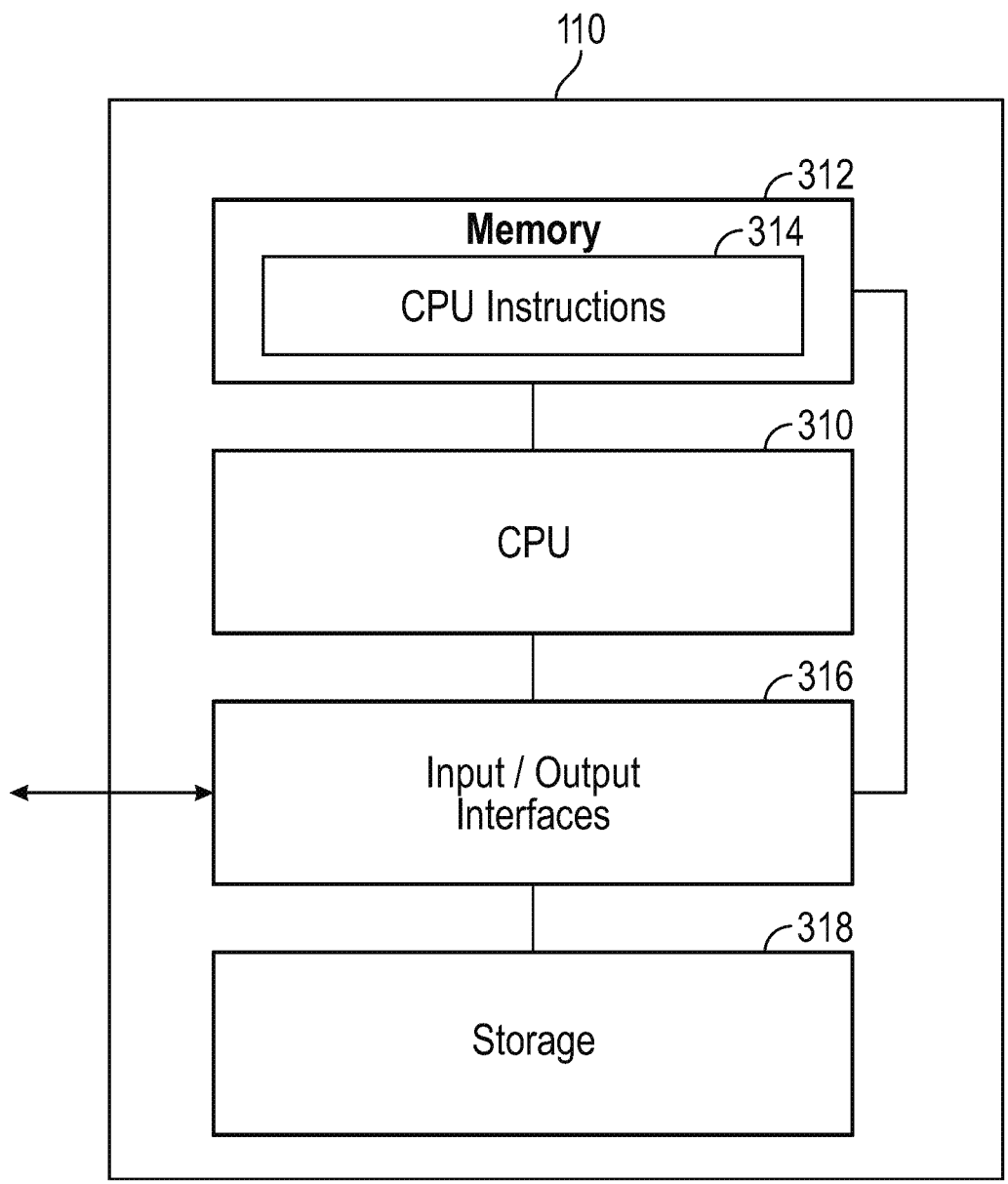
FIG. 3 provides a block diagram illustrating one embodiment of a computer system for implementing the present disclosure.
Figure 4:
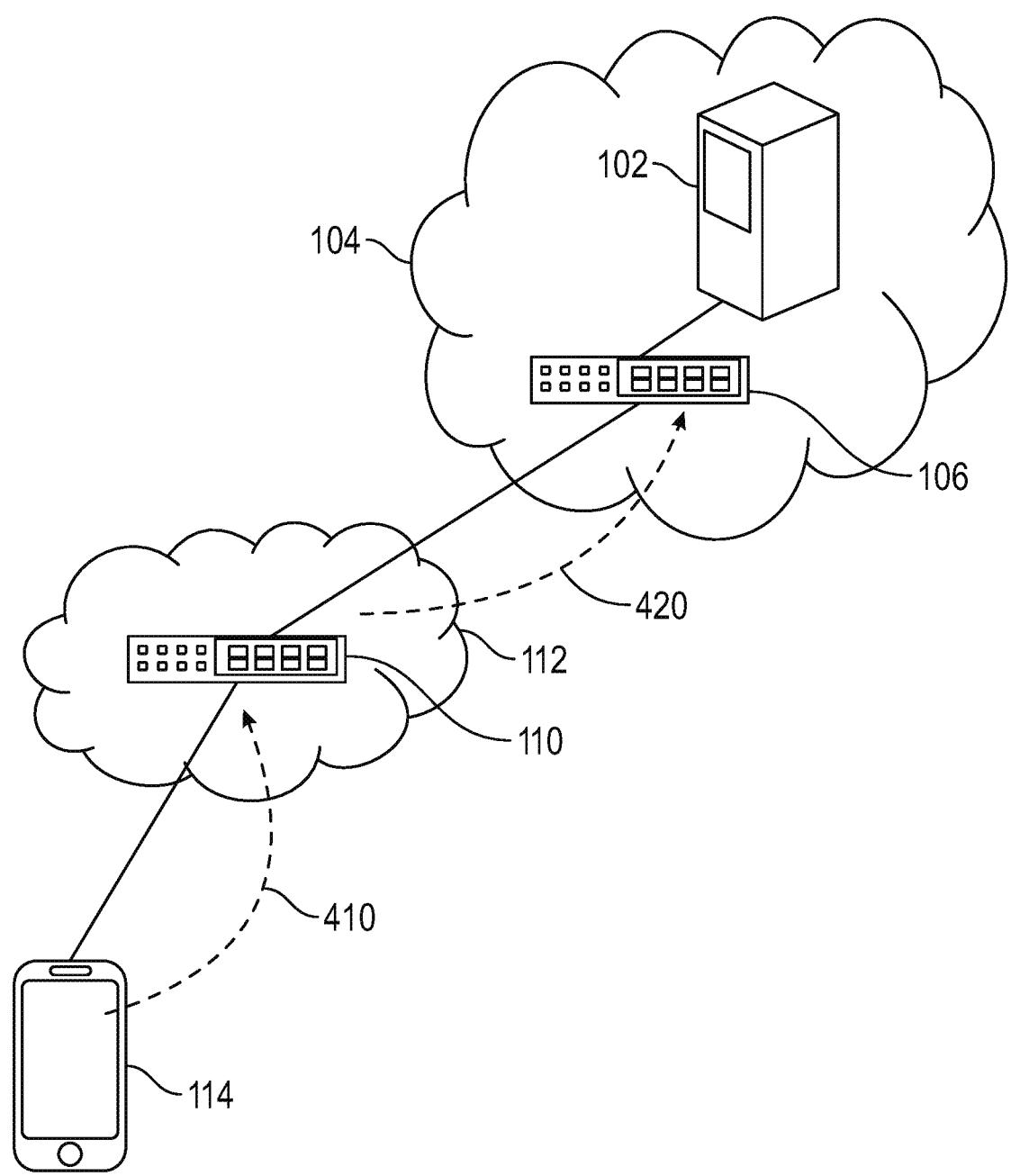
FIG. 4 provides an illustration of a communication in connection with two such network devices.
Figure 5:
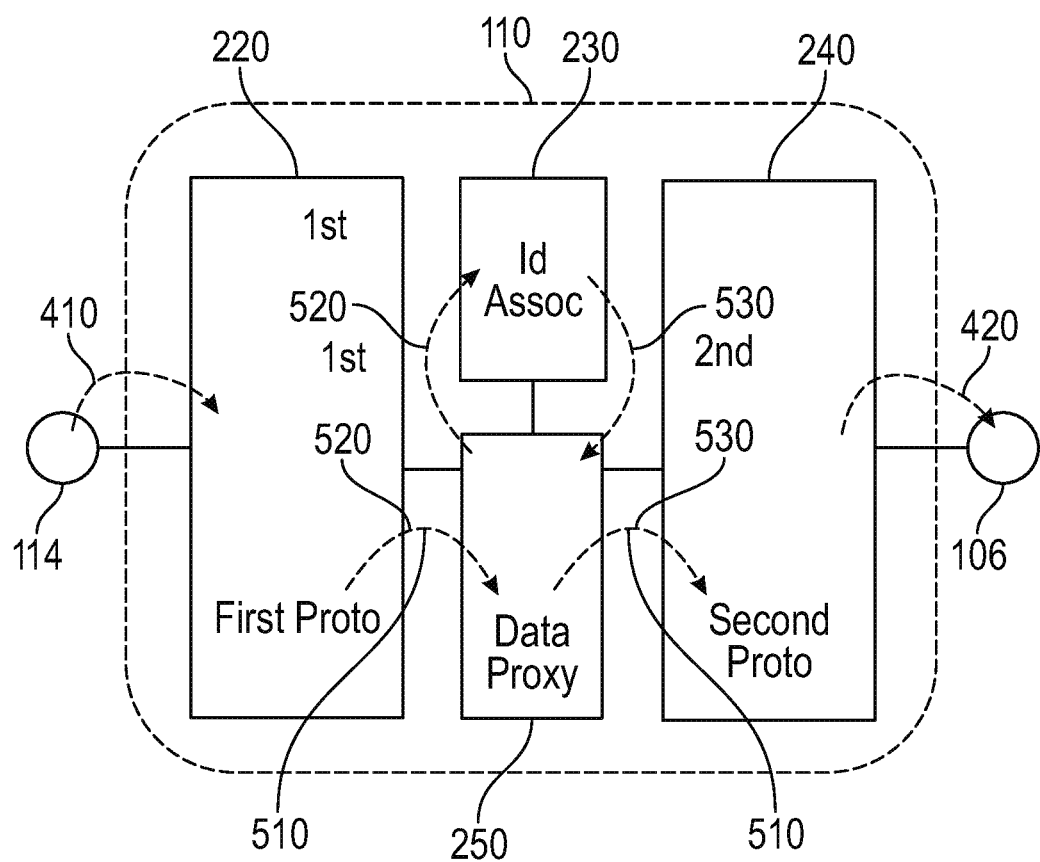
FIG. 5 provides an illustration of the present disclosure of communication from the first network device to the second network device.

Referring to FIG. 1, an illustration of the present disclosure in connection with two devices is provided. The identity adapter 110 provides for secure communication between a first network device 114 using, in, in accordance with, or utilizing a first security protocol and a second network device 106 using, in, in accordance with, or utilizing a second protocol. The first network device 114 uses or utilizes the first security protocol to communicate any communications compliant with the parameters of the first security protocol. Likewise, the second network device 106 uses or utilizes the second security protocol to communicate any communications compliant with the parameters of the second security protocol. The identity adapter 110 provides communication between a first network device 114, which may be a smartphone, and a second network device 106. The second network device 106 is hosted in a first cloud 104 and requires an authorized identity to access the cloud service 102. The identity adapter 110 is hosted in a second cloud 112. The identity adapter 110 communicates with the second network device 106 and with the first network device 114. Referring to FIG. 2, a diagram of the identity adapter 110 is provided in connection with two devices. Referring to FIG. 3, a block diagram illustrating one embodiment of a computer system for implementing the present disclosure is provided. Referring to FIG. 4, an illustration of the present disclosure in connection with two such network devices is provided. Referring to FIG. 5, an illustration of the present disclosure of communication from the first network device to the second network device is provided. The identity adapter 110 thus improves the functioning of a computer network by facilitating communication between different network devices which would otherwise be incapable of communicating and sharing data.

Referring to FIGS. 1-5, an identity adapter 110 according to the present disclosure for enabling secure communication between a first network device 114 using a first security protocol and a second network device 106 using a second security protocol, where the first security protocol is incomprehensible to the second network device, is provided. The identity adapter 110, which may have a CPU or processor 310, has a first protocol module 220, an identity associator 230, a second protocol module 240, and a data proxy 250. When present, the CPU or processor 310 may be provided in communication with a memory 312, where the memory 312 is configured to enable the control of the identity adapter 110. The identity adapter 110 can therefore be computer implemented. The first protocol module 220, the identity associator 230, the second protocol module 240, and the data proxy 250 may be provided by a common processor, by some plurality of processors, or a processor associated with each, i.e. a first protocol module processor, the identity associator processor, the second protocol module processor, and the data proxy processor. All implementations of the logic associated with each of the first protocol module 220, the identity associator 230, the second protocol module 240, and the data proxy 250 therefore, may be implemented partially or fully in software or hardware (e.g. electronics), as technology permits, and is advantageous for reasons including, but not limited to, cost, speed, and form factors. The first protocol module 220 is in communication with the data proxy 250 while the second protocol module 240 is in communication with the data proxy 250, and the data proxy 250 is in communication with the identity associator 230. The first protocol module 220 is configured to communicate with the first network device 114. In operation, the first network device 114 is in communication with the first protocol module 220. The first security protocol module 220 is configured to receive from the first network device 114 a first communicated data 510 and a first identity 520 as a first security protocol first communication 410 using the first security protocol. The first protocol module 220 is configured to convey the first communicated data 510 and the first identity 520 to the data proxy 250 and to convey the first identity 520 to the identity associator 230. The first protocol module 220 is further configured to process the first security protocol first communication 410 according to the first security protocol to extract or identify for subsequent use the first communicated data 510 and the first identity 520 and to convey the first communicated data 510 and the first identity 520 to the data proxy 250. The data proxy 250 is configured to convey the first identity 520 to the identity associator 230. The identity associator 230 is configured to select one of a plurality of potential identities as a second identity 530 using the first identity 520 in a selection criteria. The identity associator 230 is configured to communicate the second identity 530 to the data proxy 250. The data proxy 250 is configured to store proxy state information including the first identity 520 and the second identity 530. The data proxy 250 is configured to communicate the first communicated data 510 and the second identity 530 to the second protocol module 240. The second protocol module 240 is configured to communicate with the second network device 106 and is configured to communicate the first communicated data 510 and the second identity 530 to the second network device 106 using the second security protocol as a second security protocol first communication 420. In operation, the second network device 106 is in communication with the second protocol module 240

Referring now to FIG. 3, a block diagram illustrating one embodiment of a computer system for implementing the present disclosure is provided. The computer system may include a CPU instructions 314, and an input/output interface 316. Where present, the input/output interface 316 is configured to communicate with the CPU or processor 310, memory 312 and storage 318. The CPU or processor 310 is likewise configured to communicate with memory 312. When used, CPU instructions 314 may be loaded into memory 312 until fetched by the CPU or processor 310.

The system includes a computing unit, sometimes referred to as a computing system, which contains memory 312, application programs as CPU instructions 314, input/output interfaces 316, a processing unit 310, and may include storage 318. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described and illustrated herein. The memory enables steps 701-718 described in reference to FIG. 7A-7C, as well as steps 802-810 described in reference to FIG. 8, steps 901-914 described in reference to FIG. 9, steps 1002-1012 described in reference to FIG. 10, and steps 1201-1206 described in reference to FIG. 12. These may be provided as an Identity Adapter Module.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random-access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through one of the input/output interfaces, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus but may be connected by other interface and bus structures, such as a parallel port or a universal serial bus (USB).

A monitor or other type of display device as an input/output interface 316 may be connected to the system bus via an interface, such as a video interface. A GUI may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

Referring now to FIG. 4, a communication of security protocols is illustrated. In operation, the first security protocol first communication 410 is communicated from a first network device 114 to the identity adapter 110. In operation, a second security protocol first communication 420 is communicated from the identity adapter 110 to the second network device 106.

Referring now to FIG. 5, the communication in connection with the identity adapter 110 in operation is illustrated. The first protocol module 220 communicates with a data proxy 250. The data proxy 250 communicates with an identity associator 230 and a second protocol module 240. The first protocol module 220 communicates with a first network device 114. The second protocol module 240 communicates with a second network device 106.

Referring again to FIGS. 1-5, various communications are illustrated. A first security protocol first communication 410 is communicated from the first network device 114 to the identity adapter 110 and is received by the first protocol module 220. The first communicated data 510 and the first identity 520 from the first security protocol first communication 410 is communicated from the first protocol module 220 to the data proxy 250. The first identity 520 is communicated from the data proxy 250 to the identity associator 230. The second identity 530 is communicated from the identity associator 230 to the data proxy 250. The second identity 530 and the first communicated data 510 is communicated from the data proxy 250 to the second protocol module 240. A second protocol first communication 420 is communicated from the second protocol module 240 within the identity adapter 110 to the second network device 106. The first protocol module 220 and the second protocol module 240 process communications according to the first security protocol and second security protocol, respectively. Each of these security protocols is used to communicate, among other things, an identity (first identity 520, second identity 530, respectively) and any communicated data (first communicated data 510, second communicated data 1120, for example). While the identity and communicated data is being communicated by the security protocol, it is expected that the security protocol protects these communications from observation and tampering by employing cryptographic operations. The communications (first security protocol first communication 410, second security protocol first communication 420, second security protocol second communication 1110, and first security protocol second communication 1130) are preferably encrypted and therefore require processing by the respective protocol module to determine the identity and communicated message.

Referring again to FIGS. 1-5, various communications are illustrated. In one instance of the identity adapter 110, the first protocol module 220 processes communications secured by IPsec, creating a VPN tunnel between the first network device 114 and the identity adapter 110. Through the VPN tunnel, protocol data including TCP/UDP/IP and application data is conveyed. The second protocol module 240 processes communications secured by TAC and TLS protocols. These communications are conveyed using, in, in accordance with, or utilizing the IP protocol and in accordance therewith. Application data is conveyed over the TAC, TLS, and IP protocols. In this instance, the first identity 520 is used to establish the VPN tunnel using, in, in accordance with, or utilizing IPsec and in accordance therewith. The second identity 530 is used in the establishment of the TAC and TLS protocol communications. In another instance, the second protocol module 240 uses only the TLS protocol. In another instance, the second protocol module 240 uses the TAC protocol and Statistical Object Identification (SOI) to communicate the second identity 530.

Figure 6:
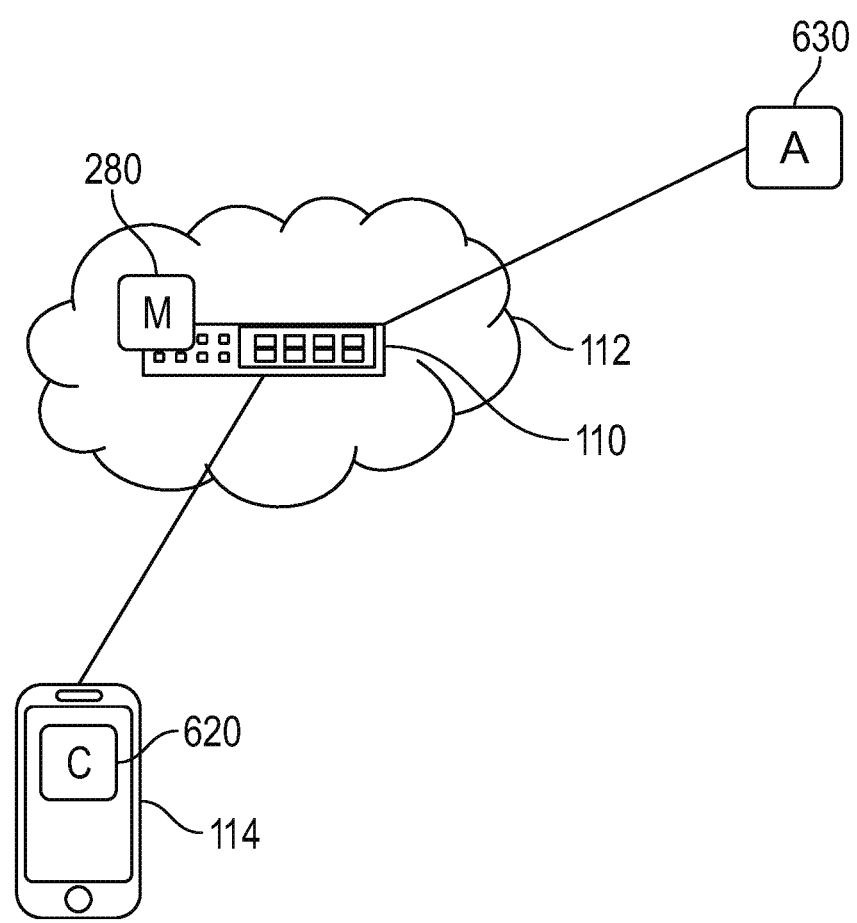
FIG. 6 provides a diagram of the management of the present disclosure.

Referring to FIG. 6, a diagram of the management of the present disclosure is provided. An identity adapter 110 communicates with a first network device 114, such as a smartphone. The identity adapter 110 may be hosted in a second cloud 112. When desired, an identity adapter manager 280 may be provided as part of associated with the identity adapter 110. A client management software application 620 may be located on the first network device 114, such as a smartphone.

In operation, there may be situations where the identities or the security protocols may be identical or non-identical. The first identity 520 may be not identical to the second identity 530 or the first identity 520 may be identical to the second identity 530. The first security protocol may be not identical to the second security protocol or the first security protocol may be identical to the second security protocol. When desired, one of the first identity 520 and the second identity 530 may obtained from a Public Key Infrastructure certificate, i.e. the PKI certificate is included to provide one or both of the first identity 520 and the second identity 530. Specifically, in a PKI certificate environment, the first identity 520 should be a different identity from the second identity 530. In a non-PKI certificate environment, a pre-shared secret may be used. There are drawbacks and risks to this approach. When a pre-shared secret is used as the identity, the first identity 520 may be the same as the second identity 530.

Likewise, the security protocols may be selected from those known in the art and may be identical or non-identical. One of the first security protocol and the second security protocol may be Internet Protocol Security. One of the first security protocol and the second security protocol may be Transport Access Control. One of the first security protocol and the second security protocol may be Transport Layer Security. One of the first security protocol and the second security protocol may be selected from the group consisting of Transport Access Control and Transport Layer Security together. The first security protocol may operate at a first layer of the Open Systems Interconnection model while the second security protocol may operate at a second layer of the Open Systems Interconnection model, where the first layer is a different layer from the second layer. One of the first security protocol and the second security protocol may utilize Statistical Object Identification.

When desired, management of one or more identities or operating parameters may be addressed with further software applications or hardware. The identity adapter 110 may include an identity adapter manager 280, where the identity associator 230 is in communication with the identity adapter manager 280. The identity adapter manager 280 may be provided by an identity adapter manager processor. All implementations of the logic associated with the identity adapter manager 280 therefore, may be implemented partially or fully in software or hardware (e.g. electronics), as technology permits, and is advantageous for reasons including, but not limited to, cost, speed, and form factors. In one situation, one of the first identity 520 and the second identity 530 may be managed by an administrator management software application 630 in communication with the identity adapter manager 280. Alternatively, one of the first identity 520 and the second identity 530 may be managed by a client manager software application 620 in communication with the identity adapter manager 280. In this alternative, when desired, the identity adapter 110 may include an administrator management software 630 in communication with the identity manager 280, where the administrator software 630 is configured to approve or disapprove the management of the first identity 520 and the second identity 530. Management, i.e. being managed, of the identity adapter and its associated components may include configuration, monitoring, provisioning, and setting of operating parameters. Management may also include the provisioning and deprovisioning of identities. Management may also include the approval or disapproval, authorization or denial of authorization, of configuration changes, provisioning changes, and other operation parameters delegated to other management applications such as the client manager software application 620.

Other considerations may be made. The identity associator 230 may be configured to include the destination of the second network device 106 in the selection criteria. Likewise, situations may arise where one of the first identity 520 and the second identity 530 may be absent. The client manager software application 620 may be configured to generate on demand one of the first identity 520 and the second identity 530.

The identity adapter 110 may be configured to operate on communications from a plurality of the first network devices 114 communicating with a plurality of the second network devices 106 concurrently. One of the first identity 520 and the second identity 530 may be generated on demand of the client manager software application 620. The identity adapter 110 may be configured to operate for the purpose of enabling secured communications between the first network device 114 and the second network device 106.

When desired, the destination of the second network device 106 is incorporated into the selection criteria of the second identity 530. In this case, for a given first identity 520, a different second identity 530 is selected based on the destination of the second network device 106. For example, if the identity adapter 110 is configured to know about a first identity 520 "John" and is associated with a second identity 530 "account 4488767" when the destination of the second network device 106 is "Bank of America". The first identity 520 "John" is also associated with a second identity 530 "account 224576" when the destination of the second network device 106 is "Wells Fargo." In this way, the identity adapter 110 selects the second identity 530 using or in consideration of both the first identity 520 and the destination of the second network device 106.

When desired, the identity adapter 110 will operate and will select a default second identity 530 associated with the absence of a first identity 520. The first network device 114 may not have a first identity 520 and may not have the capability to use a security protocol. This situation can occur with old or unsupported legacy equipment. In that case, the first identity 520 is absent. Due to security concerns, it is desirable that physical security be used to secure the first network device 114, the identity adapter 110, and the first security protocol first communication 410.

Figure 11:
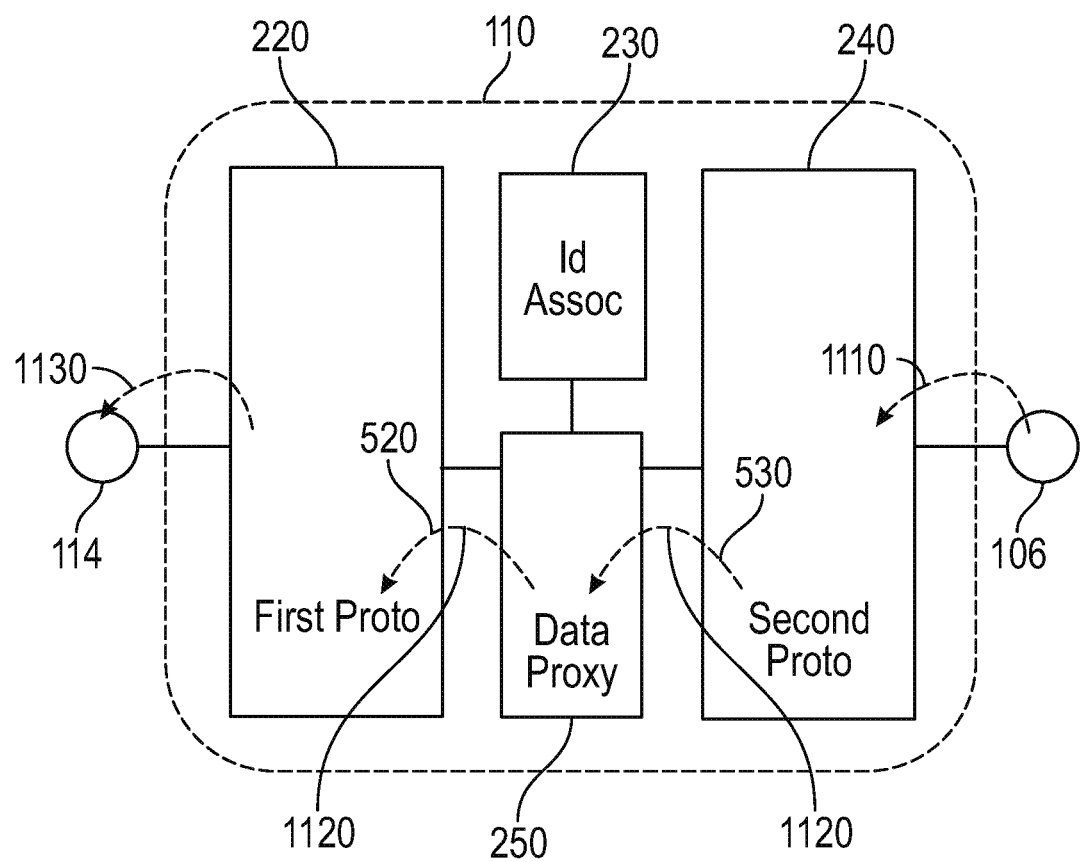
FIG. 11 provides an illustration of the present disclosure of communication from the second network device to the first network device.

Referring now to FIG. 11, an illustration of the present disclosure of communication from the second network device to the first network device is provided. When communication from the second network device to the first network device is desired, the second protocol module 240 is configured to receive from the second network device a second communicated data 1120 and the second identity 530 as a second security protocol second communication 1110 to the using the second security protocol. The second protocol module 240 is configured to receive the second security protocol second communication 1110 initiated by the second network device 106 according to the second security protocol. The second protocol module 240 is configured to process the second security protocol second communication 1110 according to the second security protocol to extract or identify for subsequent use the second communicated data 1120 and the second identity 530. The second protocol module 240 is configured to convey the second communicated data 1120 and the second identity 530 to the data proxy 250, where the data proxy 250 is configured to determine the first identity 520 from the proxy state information stored by the data proxy 250. The data proxy 250 is configured to communicate the second communicated data 1120 and the first identity 520 to the first protocol module 220, where the first protocol module 220 is configured to communicate the second communicated data 1120 and the first identity 520 to the first network device 114 using the first security protocol as a first security protocol second communication 1130.

When desired, the identity adapter 110 operates with a plurality of first network devices 114, each with their own unique first identity 520. Each of the plurality of first network devices 114 communicating to a plurality of second network devices 106. Each of the plurality of second network devices 106 requiring a unique second identity 530. The identity adapter 110 processing these multitudes of communication and their corresponding selection and use of a correct second identity 530 concurrently.

Beneficially, the system of the identity adapter 110, and the methods to implement, provide for secure communication between the first network device 114, which communicates using the first security protocol, and the second network device 106, which communicates using a second security protocol which is different from the first security protocol. Thus, a legacy network device or a network device which communicates using unsupported security protocol, as because of obsolescence, rarity, and that cannot be upgraded, patched, or otherwise made to operate using the security protocol required is enabled to communicate with a second network device 106 using a different security protocol, which itself may be obsolete or rare.

Method of Use

Figure 7A:
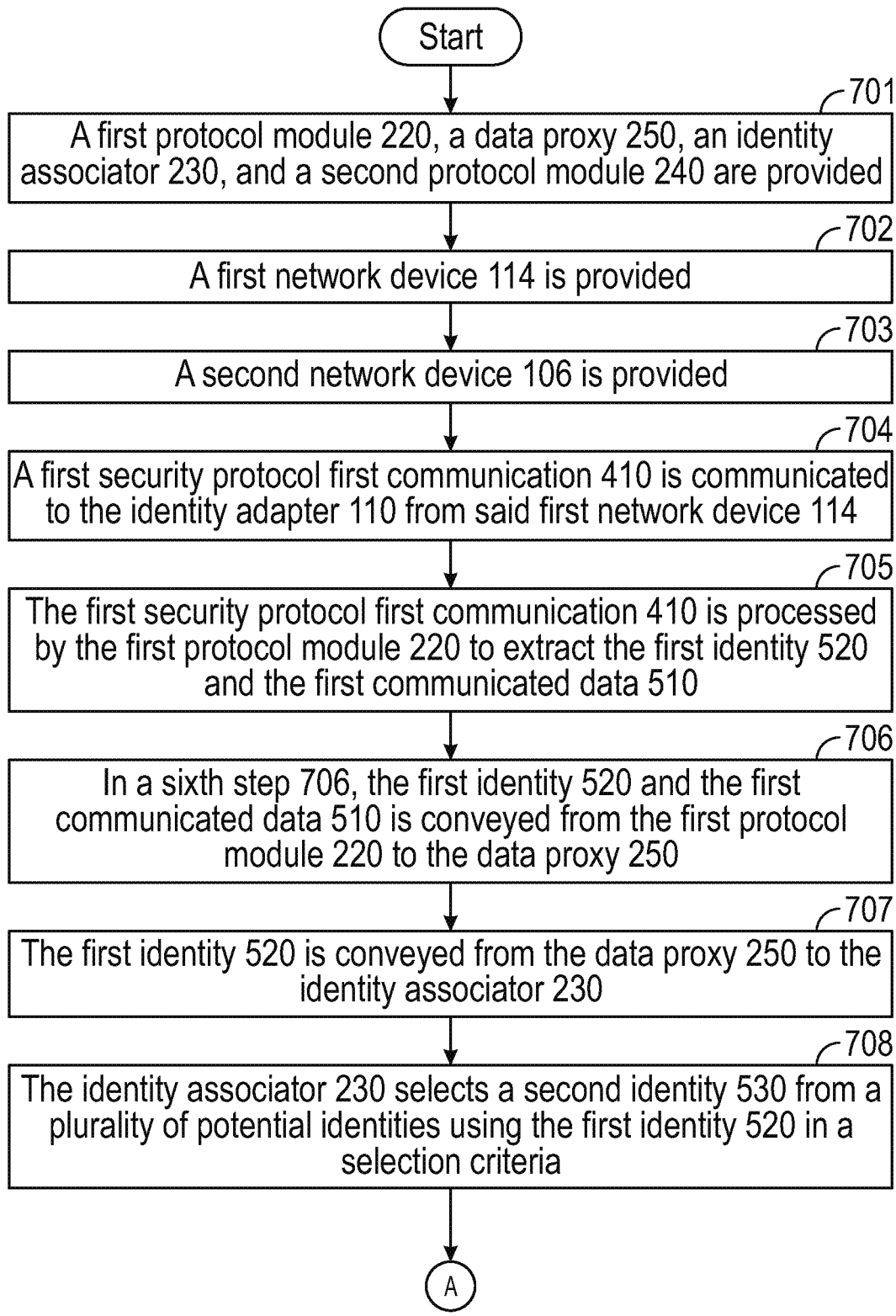
FIG. 7A-7C provide a flow chart of the order of operations of the present disclosure.
Figure 7B:
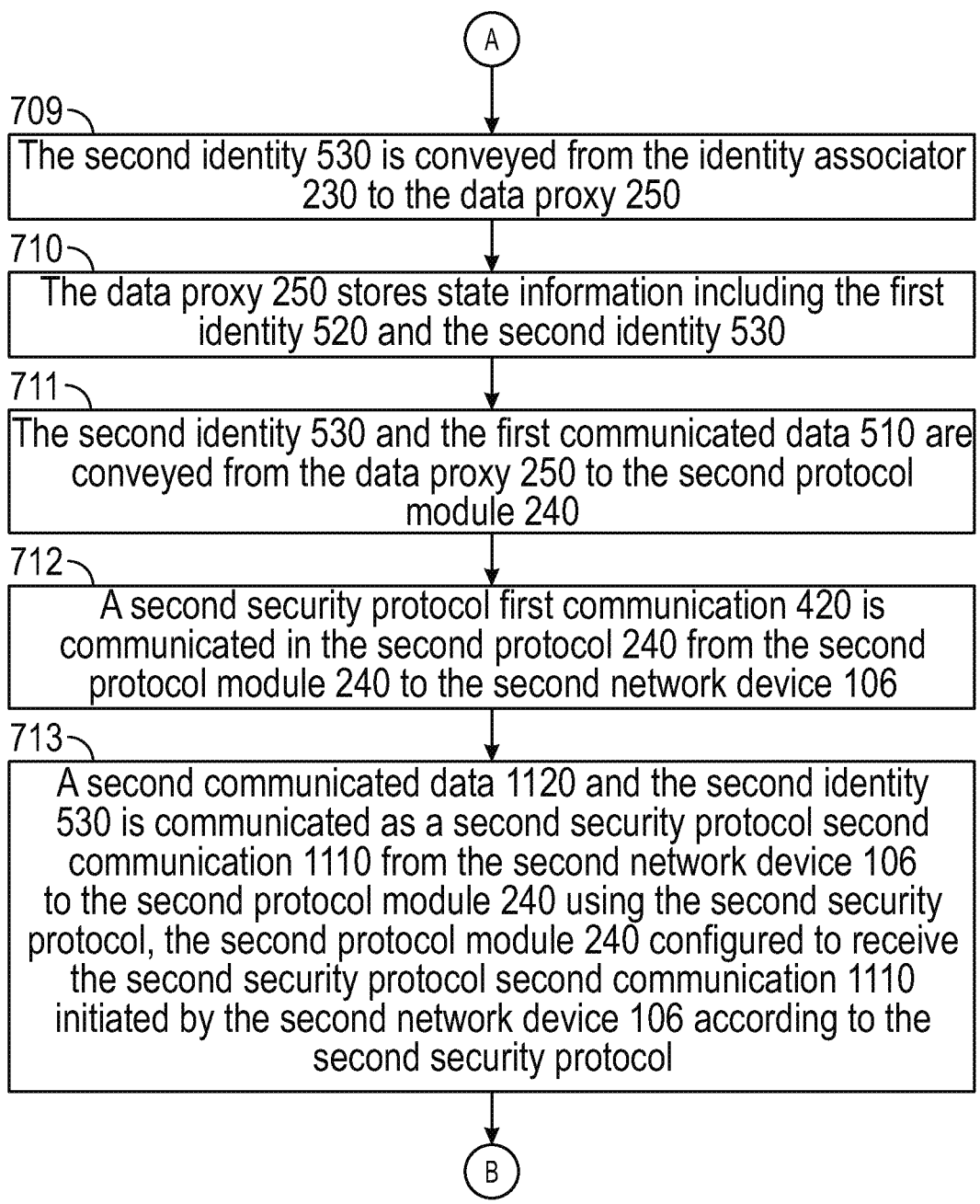
Figure 7C:
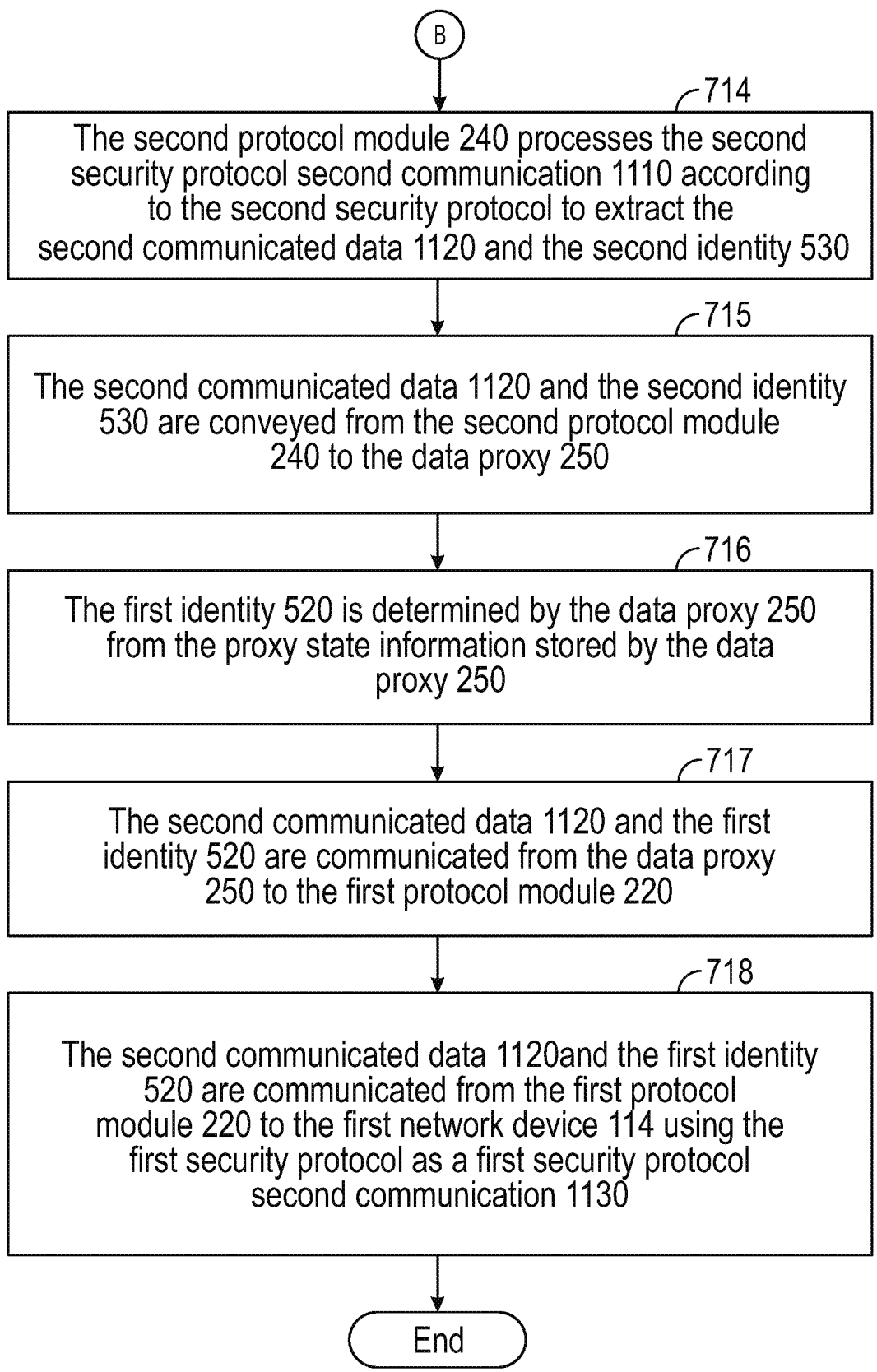

Referring to FIG. 7A-7C, a flow chart of the order of operations is provided. The identity adapter 110 may be operated for the purpose of enabling secured communications between the first network device and the second network device 106. The present disclosure may be implemented using a non-transitory program carrier device tangibly carrying computer-executable instructions for enabling secure communication between a first network device 114 and a second network device 106 using the method. The method may likewise be implemented on a computer processor, such as the CPU or processor 310.

The present disclosure may be implemented through a computer-executable program of instructions, such as program modules, generally referred to as software applications or application programs executed by a computer. The software may include, for example, routines, programs, objects, components and data structures that perform particular tasks or implement particular data types. The software forms an interface to allow a computer to react according to a source of input. The software may also cooperate with other code segments to initiate a variety of tasks in response to data received. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

The method includes a first step 701, wherein an identity adapter 110 having a first protocol module 220, a data proxy 250, an identity associator 230, and a second protocol module 240 are provided. The method then proceeds to second step 702.

In the second step 702, a first network device 114 is provided. The method then proceeds to third step 703.

In the third step 703, a second network device 106 is provided. The method then proceeds to fourth step 704.

In the fourth step 704, a first security protocol first communication 410 is communicated to the identity adapter 110 from the first network device 114, where the first security protocol first communication 410 includes a first identity 520 and first communicated data 510. This first security protocol first communication 410 can be any security protocol such as IPsec or TLS. The method then proceeds to a fifth step 705.

In the fifth step 705, the first security protocol first communication 410 is processed by the first protocol module 220 to extract or identify for subsequent use the first identity 520 and the first communicated data 510. The first protocol module 220 performs the communications necessary with the first network device 114 to establish secured communications to permit extraction of the first identity 520 and the first communicated data 510. The type of the first identity 520 can be any identity credential, a PKI certificate is a commonly used identity credential for IPsec and TLS. The method then proceeds to a sixth step 706.

In the sixth step 706, the first identity 520 and the first communicated data 510 are conveyed from the first protocol module 220 to the data proxy 250. The method then proceeds to a seventh step 707.

In the seventh step 707, the first identity 520 is conveyed from the data proxy 250 to the identity associator 230. The method then proceeds to an eighth step 708.

In the eighth step 708, the identity associator 230 selects a second identity 530 from a plurality of potential identities using the first identity 520 in a selection criteria. Alternatively, the first identity 520 may be used as the selection criteria. The selection of the second identity 530 may include a destination of the second network device 106 in the selection criteria. The identity associator 230 maintains an association of first identities 520 and their corresponding second identities 530. The identity associator 230 may maintains this in a database, a cache, a hash table or any appropriate structure that enables the identity associator 230 to match a second identity 530 to a given first identity 520. The method then proceeds to a ninth step 709.

In the ninth step 709, the second identity 530 is conveyed from the identity associator 230 to the data proxy 250. The method then proceeds to a tenth step 710.

In the tenth step 710, the data proxy 250 stores state information including the first identity 520 and the second identity 530. The data proxy 250 may store and maintain the data proxy state information in a database, a cache, a hash table or any appropriate structure. The method then proceeds to an eleventh step 711.

In the eleventh step 711, the second identity 530 and the first communicated data 510 are conveyed from the data proxy 250 to the second protocol module 240. The method then proceeds to a twelfth step 712.

In the twelfth step 712, a second security protocol first communication 420 is communicated using the second protocol from the second protocol module 240 to the second network device 106, where the second security protocol first communication 420 includes the second identity 530 and the first communicated data 510. For example, if the second network device 106 is protected by the Transport Access Control (TAC), the second security protocol could be TAC. The second security protocol can also be a combination of security protocols such as TAC and TLS. TAC engages on the first packet of a TCP session, and TLS engages once the TCP session has been established.

When desired, communication in the reverse direction may be provided through additional steps.

In a thirteenth step 713, following the twelfth step 712, a second communicated data 1120 and the second identity 530 is communicated as a second security protocol second communication 1110 from the second network device 106 to the second protocol module 240 using the second security protocol, the second protocol module 240 receives the second security protocol second communication 1110 initiated by the second network device 106 according to the second security protocol. The method then proceeds to a fourteenth step 714.

In the fourteenth step 714, the second protocol module 240 processes the second security protocol second communication 1110 according to the second security protocol to extract or identify for subsequent use the second communicated data 1120 and the second identity 530. The method then proceeds to a fifteenth step 715.

In the fifteenth step 715, the second communicated data 1120 and the second identity 530 are conveyed from the second protocol module 240 to the data proxy 250. The method then proceeds to a sixteenth step 716.

In the sixteenth step 716, the first identity 520 is determined by the data proxy 250 from the proxy state information stored by the data proxy 250. The method then proceeds to a seventeenth step 717.

In the seventeenth step 717, the second communicated data 1120 and the first identity 520 are communicated from the data proxy 250 to the first protocol module 220. The method then proceeds to an eighteenth step 718.

In the eighteenth step 718, the second communicated data 1120 and the first identity 520 are communicated from the first protocol module 220 to the first network device 114 using the first security protocol as a first security protocol second communication 1130.

Communication from the second network device 106 to the first network device 114 is thus provided.

Thus, a legacy network device or a network device that cannot be upgraded, patched, or otherwise made to operate using the security protocol required is enabled to communicate.

As provided herein, the first identity 520 might be not identical to the second identity 530 or might be identical. The first security protocol may be not identical to the second security protocol or may be identical. One of the first security protocol and the second security protocol may be Internet Protocol Security. One of the first security protocol and the second security protocol may be Transport Access Control, or Transport Layer Security, or Transport Access Control and Transport Layer Security together. The first security protocol may operate at a first layer of the Open Systems Interconnection model where the second security protocol operates at a second layer of the Open Systems Interconnection model, where the first layer is a different layer from the second layer. When desired, one of the first identity 520 and the second identity 530 may be obtained from a Public Key Infrastructure certificate. When desired, Statistical Object Identification may be utilized for one of the first security protocol and the second security protocol.

Figure 8:
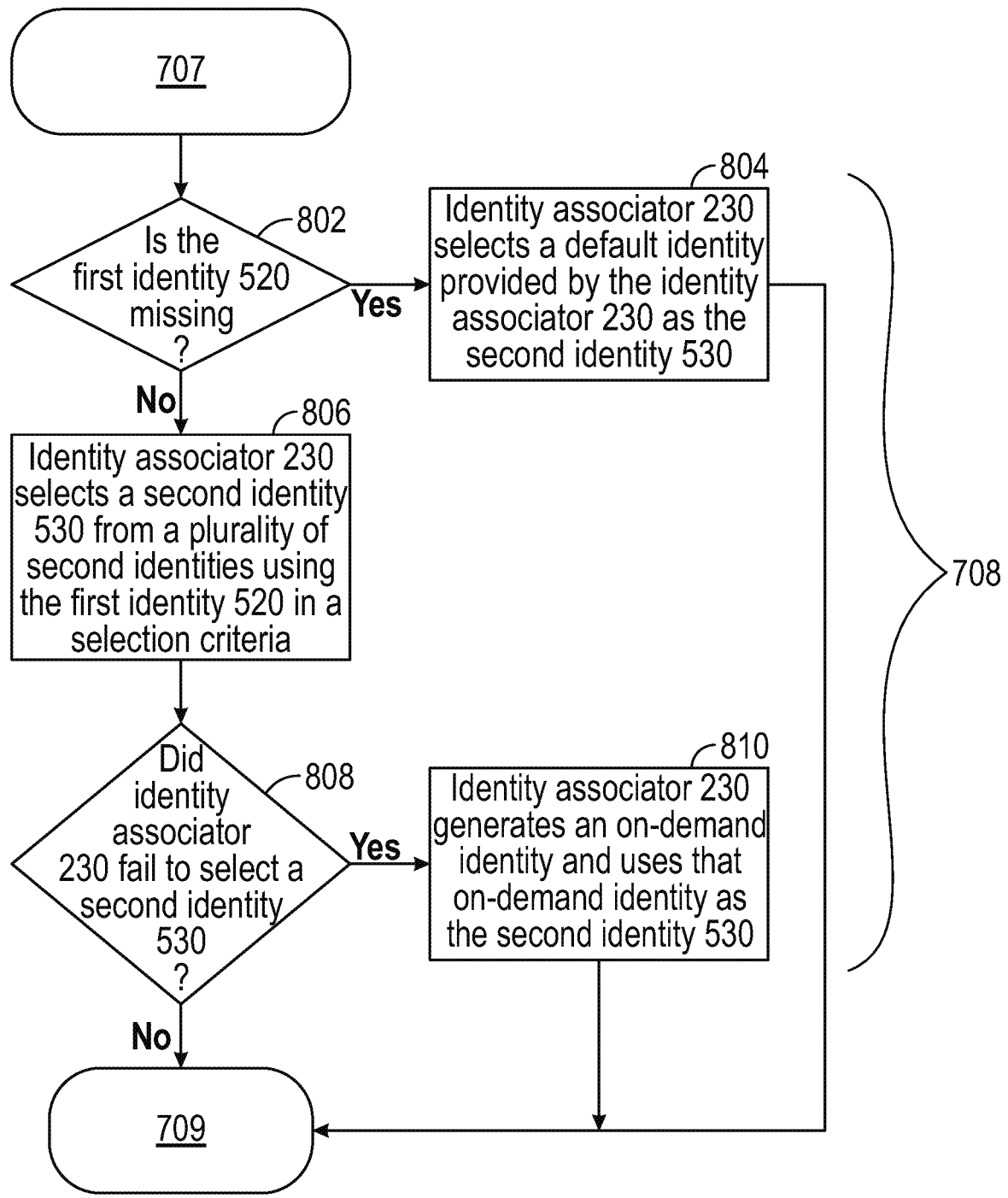
FIG. 8 provides a further flow chart of the order of operations of the present disclosure.

Referring to FIG. 8, a further flow chart of the order of operations is provided wherein the first identity 520 may be missing or cannot be extracted in the method illustrated in FIGS. 7A-7C and where the identity associator 230 fails to select a second identity 530, as the step 708, following step 707 and returning to the method illustrated at step 709.

In an identity subroutine first step 802, a determination is made whether the first identity 520 is missing, i.e. it was not received by the identity associator 230 in the seventh step 707. If the first identity 520 is missing, the identity subroutine proceeds to identity subroutine second step 804, otherwise the identity subroutine proceeds to identity subroutine third step 806.

In an identity subroutine second step 804, the identity associator 230 selects a default identity provided by the identity associator 230 as the second identity 530, the identity subroutine proceeds to ninth step 709.

In an identity subroutine third step 806, identity associator 230 selects a second identity 530 from a plurality of second identities using the first identity 520 in a selection criteria. Alternatively, the first identity 520 may be used as the selection criteria. The identity associator 230 maintains an association of first identities 520 and their corresponding second identities 530. The identity associator 230 may maintain this in a database, a cache, a hash table or any appropriate structure that enables the identity associator 230 to match a second identity 530 to a given first identity 520. The identity subroutine then proceeds to an identity subroutine fourth step 808.

In the identity subroutine fourth step 808, a determination is made whether the identity associator 230 failed to select a second identity 530. If the identity associator 230 did not fail to select a second identity 530, the identity subroutine proceeds to seventh step 709. If the identity associator 230 failed to select a second identity 530, the identity subroutine proceeds to identity subroutine fifth step 810.

In an identity subroutine fifth step 810, the identity associator 230 generates an on-demand identity and uses that on-demand identity as the second identity 530. The identity subroutine then proceeds to seventh step 709.

The identity subroutine first step 802, the identity subroutine second step 804, the identity subroutine third step 806, the identity subroutine fourth step 808, and the identity subroutine fifth step 810 may be applied as sub-steps of the eighth step, 708.

Figure 9:
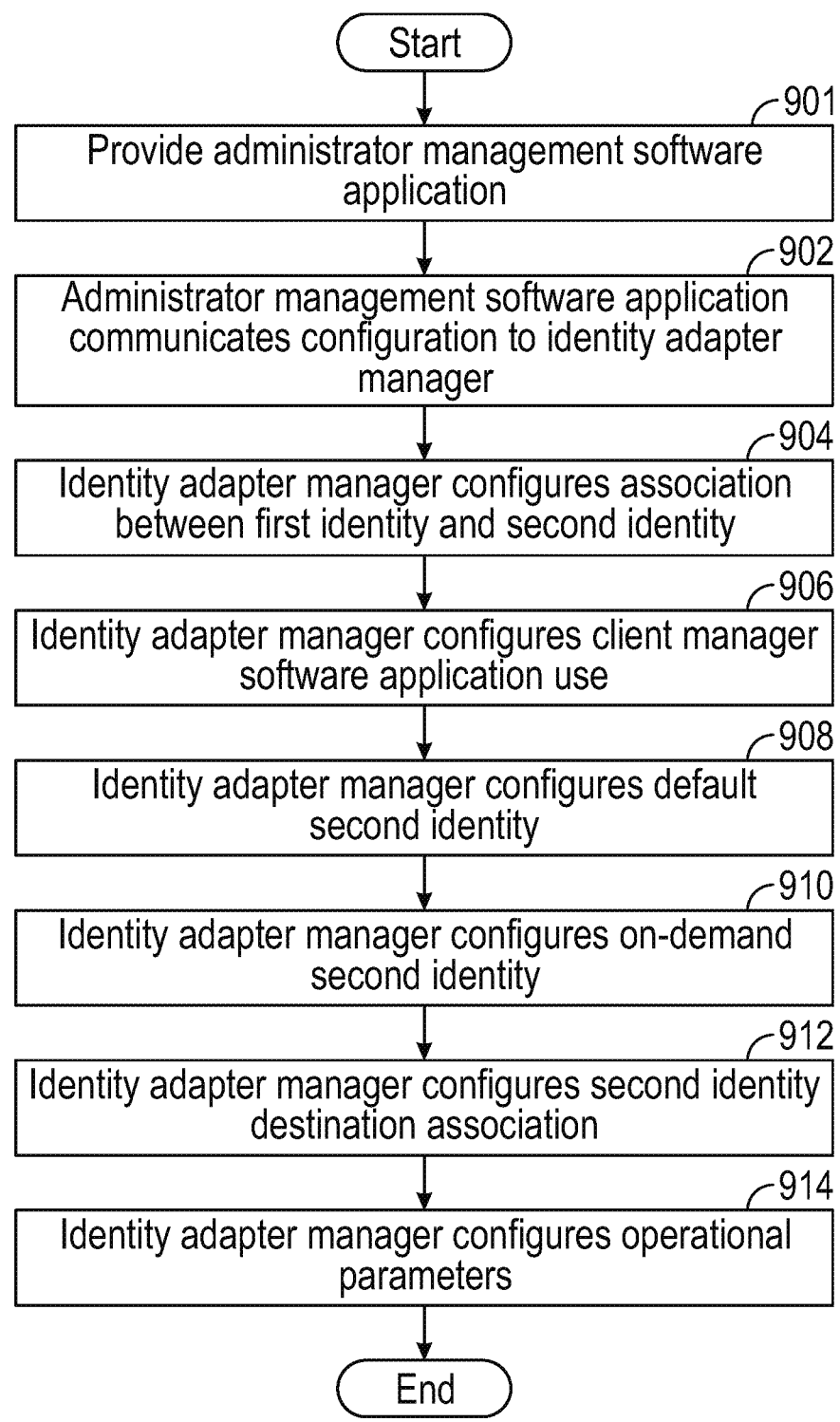
FIG. 9 provides a flow chart of the order of management operations of the present disclosure.

Referring to FIG. 9, a flow chart of the order of management operations by an administrator management application software, an administrator management subroutine, is provided.

In an administrator management first step 901, an administrator management software application 630 is provided. The administrator management subroutine then proceeds to an administrator management second step 902.

When desired, in the administrator management second step 902, the administrator management software application 630 communicates either one of the first identity 520 and the second identity 530 or an association between a first identity 520 and a second identity 530 to the identity adapter manager 280. The administrator management subroutine then proceeds to an administrator management third step 904.

When desired, in the administrator management third step 904, the identity adapter manager 280 configures the association between the first identity 520 and the second identity 530. The administrator management subroutine then proceeds to an administrator management fourth step 906.

When desired, in the administrator management fourth step 906, the identity adapter manager 280 configures client manager software application use. The administrator management subroutine then proceeds to an administrator management fifth step 908.

When desired, in the administrator management fifth step 908, the identity adapter manager 280 configures the default second identity. The administrator management subroutine then proceeds to an administrator management sixth step 910.

When desired, in the administrator management sixth step 910, the identity adapter manager 280 configures on-demand second identity. The administrator management subroutine then proceeds to an administrator management seventh step 912.

When desired, in the administrator management seventh step 912, the identity adapter manager 280 configures second identity destination application. The administrator management subroutine then proceeds to an administrator management eighth step 912.

When desired, in the administrator management eighth step 914, the identity adapter manager 280 configures operational parameters.

Figure 12:
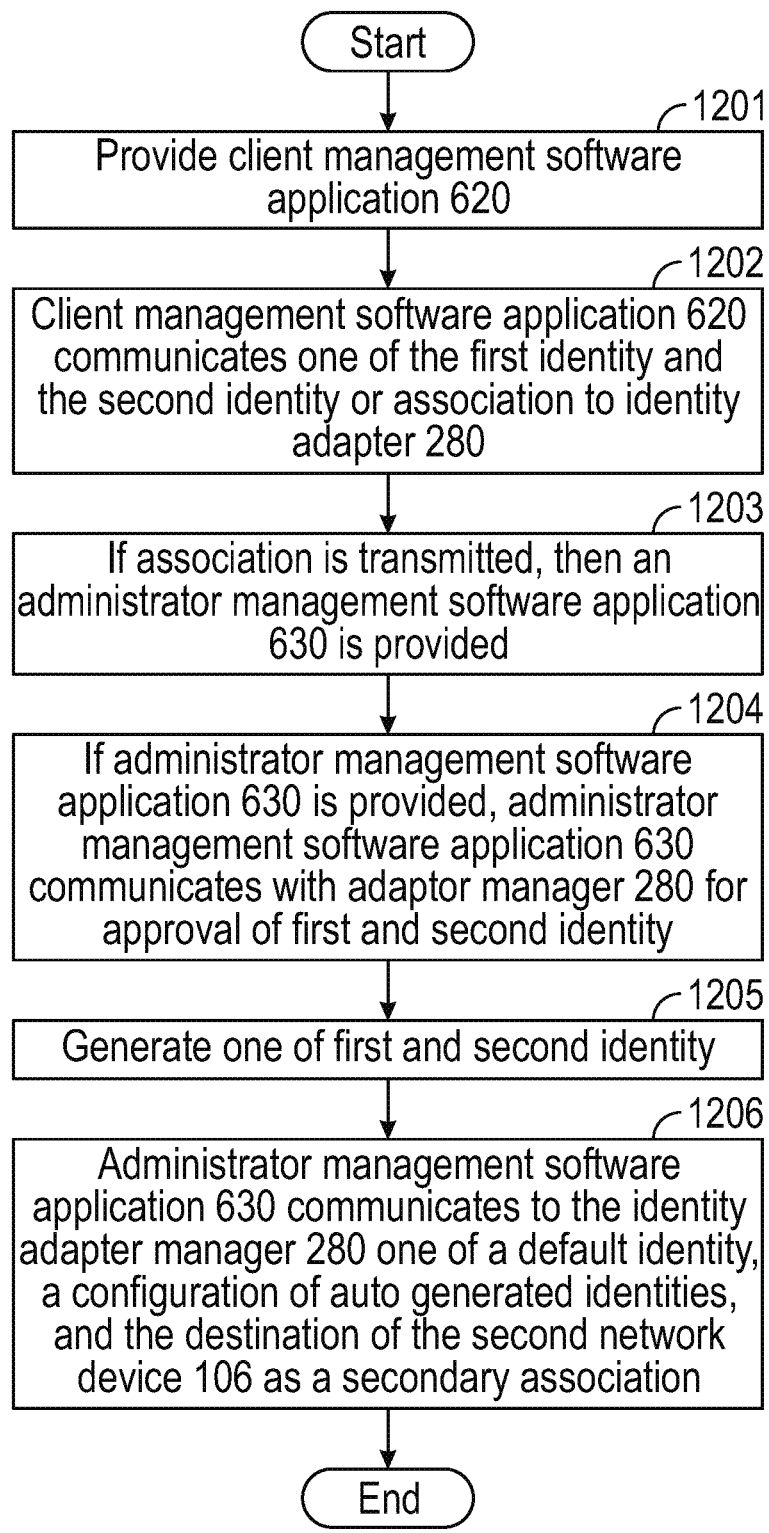
FIG. 12 provides a flow chart of the order of management operations by a client management application software application.

Referring to FIG. 12, a flow chart of the order of management operations by a client management application software application, a client management subroutine, is provided.

In a client management subroutine first step 1201, a client management software application 620 is provided. The client management subroutine then proceeds to a client management subroutine second step 1202.

In the client management subroutine second step 1202, the client management software application 620 communicates one of the first identity 520 and the second identity 530 or an association between the first identity 520 and the second identity 530 to an identity adapter manager 280. The client management subroutine then proceeds to a client management subroutine third step 1203.

In the client management subroutine third step 1203, when the client management software application 620 communicates an association between the first identity 520 and the second identity 530 to an identity adapter manager 280, an administrator management software application 630 may be provided, when desired. The client management subroutine then proceeds to a client management subroutine fourth step 1204.

In the client management fourth step 1204, when an administrator management software application 630 is provided, the administrator management software application 630 communicates with the identity adapter manager 280 to obtain review for approval of one of the first identity 520 and the second identity 530 communicated from the client manager software application 630. The client management subroutine then proceeds to a client management subroutine fifth step 1205.

In a client management subroutine fifth step 1205, when the client management software application 620 communicates one of the first identity 520 and the second identity 530 to an identity adapter manager 280, one of the first identity 520 and the second identity 530 is generated on demand of the client management software application 620. The client management subroutine then proceeds to a client management subroutine sixth step 1206.

When desired, the client management subroutine sixth step 1206 may be included wherein the administrator management software application 630 communicates to the identity adapter manager 280 one of a default identity, a configuration of auto generated identities, and the destination of the second network device 106 as a secondary association.

Figure 10:
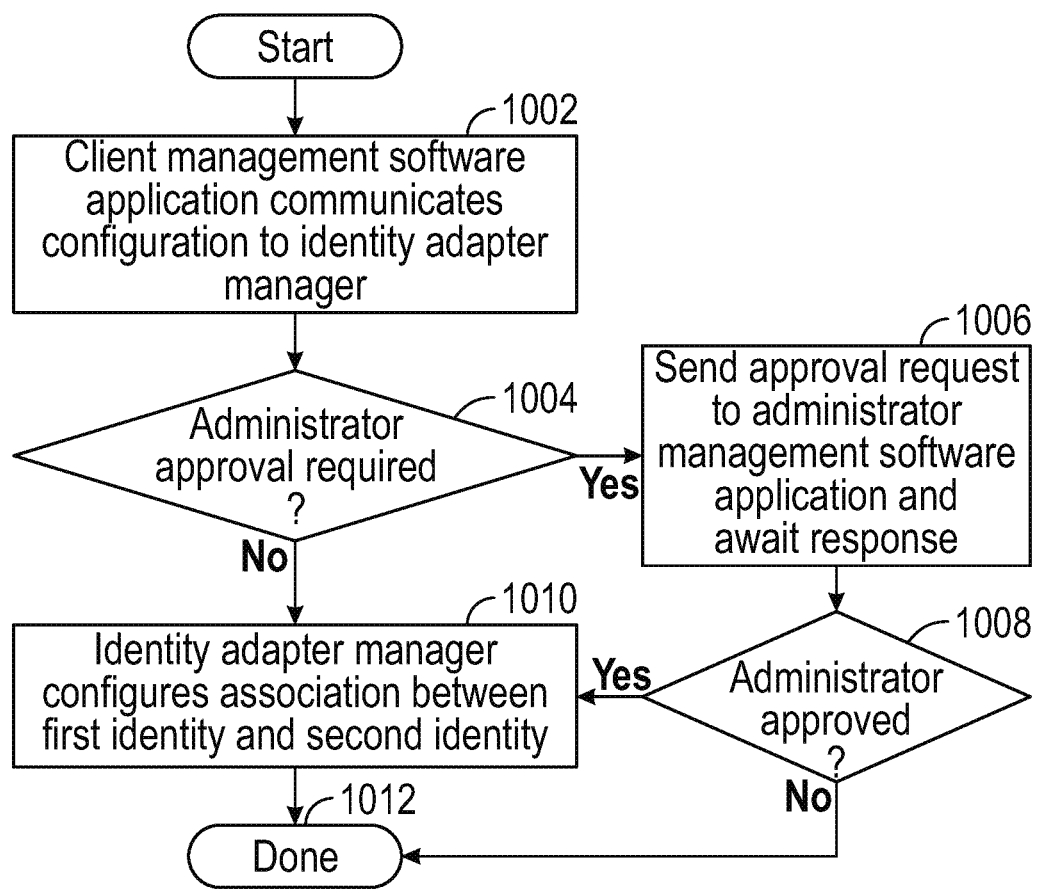
FIG. 10 provides a further flow chart of the order of management operations of the present disclosure.

Referring to FIG. 10, a further flow chart of the order of management operations, a management subroutine, is provided.

In a management subroutine first step 1002, the client management software application 620 communicates configuration information to the identity adapter manager 280. When the client management software application 620 is used, the first network device 114 can manage its own identity associations. The management subroutine then proceeds to a management subroutine second step 1004.

In the management subroutine second step 1004, a determination is made whether identity adapter manager 280 is configured to require administrator approval. If administrator approval is required, the management subroutine proceeds to management subroutine third step 1006. If administrator approval is not required, the management subroutine proceeds to management subroutine fifth step 1010. To ensure the overall security of the system, it is recommended that in a self-service environment such as this, that the administrator management software application 630 approve identity associations originating from a client management software application 620. The management subroutine then proceeds to a management subroutine third step 1006.

In the management subroutine third step 1006, the identity adapter manager 280 sends an approval request to the administrator management software application 630 and awaits a response. The management subroutine then proceeds to a management subroutine fourth step 1008.

In a management subroutine fourth step 1008, the identity adapter manager receives a response to the approval request. If the request is not approved, the management subroutine proceeds to management subroutine sixth step 1012. If the request is approved, the management subroutine proceeds to the management subroutine fifth step 1010.

In a management subroutine fifth step 1010, the identity adapter manager 280 configures an association between a first identity 520 and a second identity 530. The management subroutine then proceeds to a management subroutine sixth step 1012.

In a management subroutine sixth step 1012, no more action is taken by the identity adapter manager 280.

LIST OF REFERENCE CHARACTERS

- 102 Cloud Service
- 104 First Cloud
- 106 Second Network Device
- 110 Identity Adapter
- 112 Second Cloud
- 114 First Network Device
- 220 First Protocol module
- 230 Identity Associator
- 240 Second Protocol module
- 250 Data Proxy
- 280 Identity Adapter Manager
- 310 CPU
- 312 Memory
- 314 CPU Instructions
- 316 Input/Output Interface
- 318 Storage
- 410 First Security Protocol First Communication
- 420 Second Security Protocol First Communication
- 510 First Communicated Data
- 520 First Identity
- 530 Second Identity
- 620 Client Management Software Application
- 630 Administrator Management Software Application
- 701 First Step
- 702 Second Step
- 703 Third Step
- 704 Fourth Step
- 705 Fifth Step
- 706 Sixth Step
- 707 Seventh Step
- 708 Eighth Step
- 709 Ninth Step
- 710 Tenth Step
- 711 Eleventh Step
- 712 Twelfth Step
- 713 Thirteenth Step
- 714 Fourteenth Step
- 715 Fifteenth Step
- 716 Sixteenth Step
- 717 Seventeenth Step
- 718 Eighteenth Step
- 802 Identity Subroutine First Step
- 804 Identity Subroutine Second Step
- 806 Identity Subroutine Third Step
- 808 Identity Subroutine Fourth Step
- 810 Identity Subroutine Fifth Step
- 901 Administration Management Subroutine First Step
- 902 Administration Management Subroutine Second Step
- 904 Administration Management Second Subroutine Third Step
- 906 Administration Management Second Subroutine Fourth Step
- 908 Administration Management Second Subroutine Fifth Step
- 910 Administration Management Second Subroutine Sixth Step
- 912 Administration Management Second Subroutine Seventh Step
- 914 Administration Management Second Subroutine Eighth Step
- 1002 Management Subroutine First Step
- 1004 Management Subroutine Second Step
- 1006 Management Subroutine Third Step
- 1008 Management Subroutine Fourth Step
- 1010 Management Subroutine Fifth Step
- 1012 Management Subroutine Sixth Step
- 1110 Second Security Protocol Second Communication
- 1120 Second Communicated Data
- 1130 First Security Protocol Second Communication
- 1201 Client Management First Step
- 1202 Client Management Second Step
- 1203 Client Management Third Step
- 1204 Client Management Fourth Step
- 1205 Client Management Fifth Step
- 1206 Client Management Sixth Step The foregoing disclosure and description is illustrative and explanatory thereof. Various changes in the details of the illustrated construction may be made within the scope of the appended claims without departing from the spirit of the disclosure. The present disclosure should only be limited by the following claims and their legal equivalents.

What is claimed is:

1. An identity adapter for enabling secure communication between a first network device and a second network device, said first network device using a first security protocol, said second network device using a second security protocol, where said first security protocol is incomprehensible to said second network device, comprising a first protocol module, an identity associator, a second protocol module, and a data proxy, said first protocol module in communication with said data proxy, said first protocol module configured to communicate with said first network device, said second protocol module in communication with said data proxy, said data proxy in communication with said identity associator;

said first protocol module configured to receive a first security protocol first communication from said first network device according to said first security protocol, said first security protocol first communication having a first communicated data and a first identity, said first protocol module configured to process said first security protocol first communication according to said first security protocol to extract said first communicated data and said first identity, said first protocol module configured to convey said first communicated data and said first identity to said data proxy, said data proxy configured to convey said first identity to said identity associator;

said identity associator configured to select one of a plurality of potential identities as a second identity using said first identity in a selection criteria;

said identity associator configured to communicate said second identity to said data proxy;

said data proxy configured to store proxy state information including said first identity and said second identity;

said data proxy configured to communicate said first communicated data and said second identity to said second protocol module; and said second protocol module configured to communicate said first communicated data and said second identity to said second network device using said second security protocol as a second security protocol first communication.

2. The identity adapter of claim 1 wherein:
said first identity is not identical to said second identity.

3. The identity adapter of claim 1 wherein:
said first identity is identical to said second identity.

4. The identity adapter of claim 1 wherein:
said first security protocol is not identical to said second security protocol.

5. The identity adapter of claim 1 wherein:
said first security protocol is identical to said second security protocol.

6. The identity adapter of claim 1 wherein:
one of said first security protocol and said second security protocol is Internet Protocol Security.

7. The identity adapter of claim 1 wherein:
one of said first security protocol and said second security protocol is Transport Access Control.

8. The identity adapter of claim 1 wherein:
one of said first security protocol and said second security protocol is Transport Layer Security.

9. The identity adapter of claim 1 wherein:
one of said first security protocol and said second security protocol is Transport Access Control and Transport Layer Security together.

10. The identity adapter of claim 1 wherein:
said first security protocol is configured to operate at a first layer of an Open Systems Interconnection model and said second security protocol is configured to operate at a second layer of said Open Systems Interconnection model, said first layer being a different layer from said second layer.

11. The identity adapter of claim 1 further comprising:
a Public Key Infrastructure certificate to provide one of said first identity and said second identity.

12. The identity adapter of claim 1 wherein:
one of said first security protocol and said second security protocol includes Statistical Object Identification.

13. The identity adapter of claim 1 further comprising an identity adapter manager, said identity associator in communication with said identity adapter manager wherein:
an administrator management software application in communication with said identity adapter manager, said administrator management software application is configured to manage one of said first identity and said second identity.

14. The identity adapter of claim 1 further comprising:
an identity adapter manager, said identity associator in communication with said identity adapter manager; and
a client manager software application in communication with said identity adapter manager, said client manager software application configured to manage one of said first identity and said second identity.

15. The identity adapter of claim 14 further comprising:
an administrator management software application in communication with said identity adapter manager, said administrator management software application configured to approve or disapprove said management of said one of said first identity and said second identity.

16. The identity adapter of claim 1 wherein:
said identity associator is configured to include a destination of said second network device in said selection criteria.

17. The identity adapter of claim 1 wherein:
one of said first identity and said second identity is absent.

18. The identity adapter of claim 14 wherein:
said client manager software application is configured to generate on demand one of said first identity and said second identity.

19. The identity adapter of claim 1 wherein:
said second protocol module configured to receive from said second network device a second communicated data and said second identity as a second security protocol second communication to using said second security protocol,
said second protocol module configured to receive said second security protocol second communication initiated by said second network device according to said second security protocol,
said second protocol module configured to process said second security protocol second communication according to said second security protocol to extract said second communicated data and said second identity,
said second protocol module configured to convey said second communicated data and said second identity to said data proxy,
said data proxy configured to determine said first identity from said proxy state information stored by said data proxy;
said data proxy configured to communicate said second communicated data and said first identity to said first protocol module;
said first protocol module configured to communicate said second communicated data and said first identity to said first network device using said first security protocol as a first security protocol second communication.

20. A method for enabling secure communication between a first network device and a second network device, said first network device using a first security protocol, said second network device using a second security protocol, where said first security protocol is incomprehensible to said second network device, comprising the steps of:
providing an identity adapter having a first protocol module, a data proxy, an identity associator, and a second protocol module;
communicating a first security protocol first communication to said identity adapter from said first network device, said first security protocol first communication including a first identity and first communicated data;
processing by said first protocol module said first security protocol first communication to extract said first identity and said first communicated data;
conveying from said first protocol module said first identity and said first communicated data to said data proxy;
conveying from said data proxy said first identity to said identity associator;
selecting by said identity associator a second identity from a plurality of potential identities using said first identity in a selection criteria;
conveying from said identity associator said second identity to said data proxy;
storing by said data proxy state information including said first identity and said second identity;
conveying from said data proxy said second identity and said first communicated data to said second protocol module;
communicating in said second protocol a second security protocol first communication from said second protocol module to said second network device, said second security protocol first communication including said second identity and said first communicated data.

21. The method of claim 20 wherein:
said first identity is not identical to said second identity.
22. The method of claim 20 wherein:
said first identity is identical to said second identity.
23. The method of claim 20 wherein:
said first security protocol is not identical to said second security protocol.
24. The method of claim 20 wherein:
said first security protocol is identical to said second security protocol.
25. The method of claim 20 wherein:
one of said first security protocol and said second security protocol is Internet Protocol Security.
26. The method of claim 20 wherein:
one of said first security protocol and said second security protocol is Transport Access Control.
27. The method of claim 20 wherein:
one of said first security protocol and said second security protocol is Transport Layer Security.
28. The method of claim 20 wherein:
one of said first security protocol and said second security protocol is Transport Access Control and Transport Layer Security together.
29. The method of claim 20 wherein:
said first security protocol operates at a first layer of an Open Systems Interconnection model and said second security protocol operates at a second layer of said Open Systems Interconnection model, said first layer being a different layer from said second layer.
30. The method of claim 20 further comprises:
obtaining one of said first identity and said second identity from a Public Key Infrastructure certificate.
31. The method of claim 20 further comprises:
utilizing Statistical Object Identification for one of said first security protocol and said second security protocol.
32. The method of claim 20, further comprising the steps of:
providing an administrator management software application; and
communicating by said administrator management software application one of said first identity and said second identity to an identity adapter manager.
33. The method of claim 20, further comprising the steps of:
providing an administrator management software application; and
communicating by said administrator management software application an association between one of said first identity and one of said second identity to an identity adapter manager.
34. The method of claim 20, further comprising the steps of:
providing a client manager software application; and
communicating by said client manager software application one of said first identity and said second identity to an identity adapter manager.
35. The method of claim 20, further comprising the steps of:
providing a client manager software application; and
communicating by said client manager software application an association between one of said first identity and one of said second identity to an identity adapter manager.
36. The method of claim 35, further comprising the steps of:
providing an administrator management software application;
communicating by said administrator management software application with said identity adapter manager; and
reviewing for approval said one of said first identity and said second identity communicated by said client manager software application.
37. The method of claim 20 wherein:
said selection of said second identity includes a destination of said second network device in said selection criteria.
38. The method of claim 20 wherein:
one of said first identity and said second identity is absent.
39. The method of claim 34 wherein:
one of said first identity and said second identity is generated on demand of said client manager software application.
40. The method of claim 20 further comprising:
communicating a second communicated data and said second identity as a second security protocol second communication from said second network device to said second protocol module using said second security protocol, said second protocol module configured to receive said second security protocol second communication initiated by said second network device according to said second security protocol,
processing by said second protocol module said second security protocol second communication according to said second security protocol to extract said second communicated data and said second identity,
conveying said second communicated data and said second identity from said second protocol module to said data proxy,
determining by said data proxy said first identity from said proxy state information stored by said data proxy;
communicating said second communicated data and said first identity from said data proxy to said first protocol module; and
communicating from said first protocol module to said first network device said second communicated data and said first identity using said first security protocol as a first security protocol second communication.
41. The method of claim 20 further comprising:
providing by said identity associator a default identity;
determining by said identity associator that said first identity is absent; and
selecting said default identity as said second identity.
42. The method of claim 20 further comprising:
failing by said identity associator to select said second identity;
generating by said identity associator an on-demand identity; and
using by said identity associator said on-demand identity as said second identity.
43. The method of claim 33 further comprising:
communicating by said administrator management software application a default identity to said identity adapter manager.
44. The method of claim 33 further comprising:
communicating by said administrator management software application a configuration of auto generated identities to said identity adapter manager.

45. The method of claim 33 further comprising:
communicating by said administrator management software application said destination of said second network device as a secondary association to said identity adapter manager.

46. A non-transitory program carrier device tangibly carrying computer-executable instructions for enabling secure communication between a first network device and a second network device, said first network device using a first security protocol, said second network device using a second security protocol, where said first security protocol is incomprehensible to said second network device, comprising the steps of:
communicating a first security protocol first communication to said identity adapter from said first network device, said first security protocol first communication including a first identity and first communicated data;
processing by a first protocol module said first security protocol first communication to extract said first identity and said first communicated data;
conveying from said first protocol module said first identity and said first communicated data to a data proxy;
conveying from said data proxy said first identity to an identity associator;
selecting by said identity associator a second identity from a plurality of potential identities using said first identity in a selection criteria;
conveying from said identity associator said second identity to said data proxy;
storing by said data proxy state information including said first identity and said second identity;
conveying from said data proxy said second identity and said first communicated data to a second protocol module; and
communicating in said second protocol a second security protocol first communication from said second protocol module to said second network device, said second security protocol first communication including said second identity and said first communicated data.

\* \* \* \* \*